Jan. 12, 1926.　　B. P. COLLIER　　1,569,266
PLOW TRACTOR
Filed July 20, 1925　　2 Sheets-Sheet 2

Inventor
B. P. Collier
By C. A. Snow & Co.
Attorney

Patented Jan. 12, 1926.

1,569,266

UNITED STATES PATENT OFFICE.

BENJAMIN P. COLLIER, OF ALBANY, ALABAMA.

PLOW TRACTOR.

Application filed July 20, 1925. Serial No. 44,878.

*To all whom it may concern:*

Be it known that I, BENJAMIN P. COLLIER, a citizen of the United States, residing at Albany, in the county of Morgan and State of Alabama, have invented a new and useful Plow Tractor, of which the following is a specification.

The device forming the subject matter of this application is an improvement on the structure shown in Patent No. 1,485,604, granted on March 4, 1924, to Cameron H. Gemberling, of South Bend, Indiana, for sundry improvements in a wheeled plow. The device shown in the patent mentioned comprises a land wheel, located at one side of the plow frame, and a furrow wheel located at the rear end of the plow frame. A means under the control of an operator is provided, in the patented device, for turning the land wheel and the furrow wheel, together, laterally. This invention aims to provide novel means whereby the aforesaid wheels may be turned automatically, by the tractor, to follow the course which the tractor is pursuing.

It is within the province of the disclosure to improve generally and to enhance the utility of devices of that type to which the invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
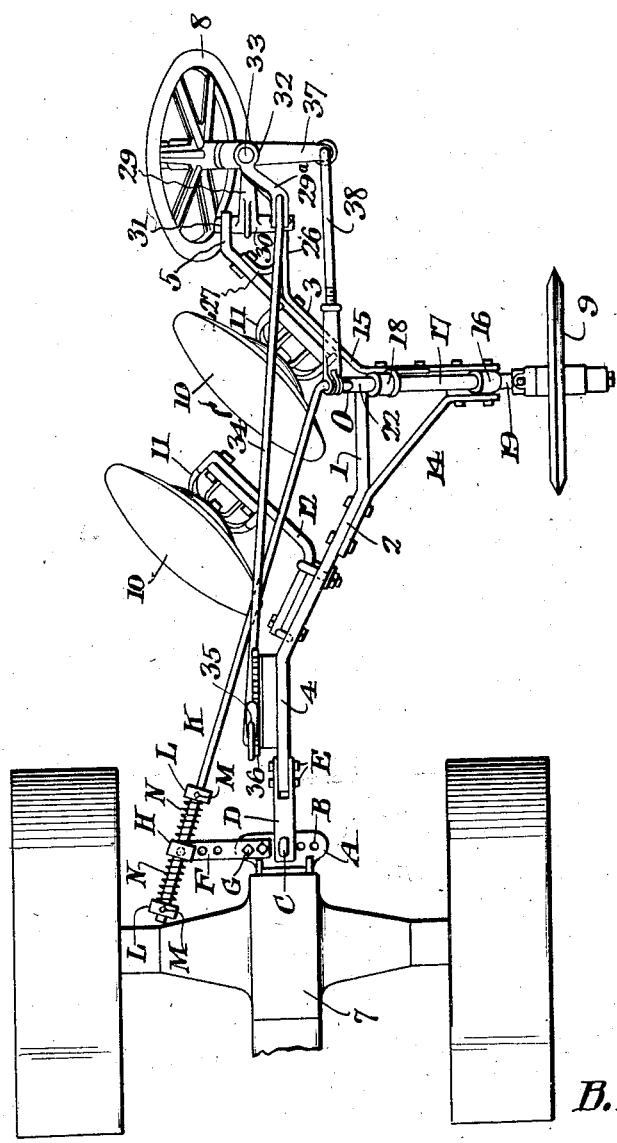
Figure 1 shows in top plan, a device constructed in accordance with the invention.
Figure 2:
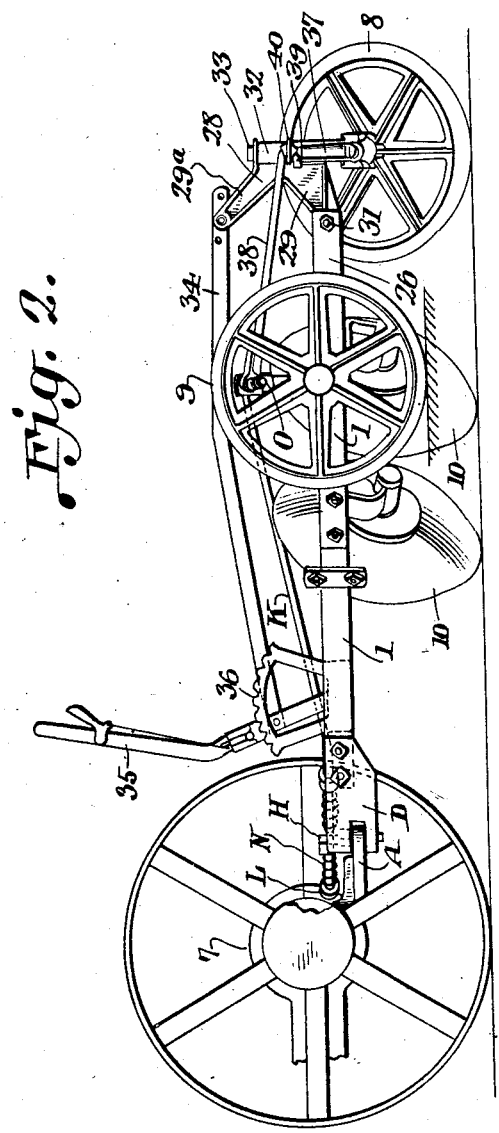
Figure 2 is a side elevation.
Figure 3:
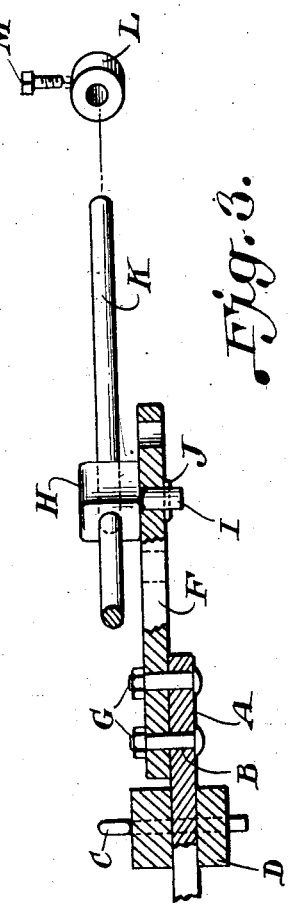
Figure 3 is a sectional view illustrating a portion of the mechanism which characterizes this application patentably.

In order that it may be understood clearly what kind of a plow the device forming the subject matter of this application is to be applied to, it is necessary to describe, at some length, portions of the plow shown in the aforesaid Patent No. 1,485,604. Notice will be given when the description of that which is old is concluded, and when the description of that which is new begins.

The plow is adapted to be drawn by a tractor 7, and the plow itself comprises a main frame beam 1 having forward and rear diagonal portions 2 and 3, the forward beam member 2 being extended to provide a beam or frame member 4 approximately coincident with the line of draft of the plow structure, and the rear diagonal member being extended to provide a short rear beam or frame member 5 disposed parallel with the line of draft.

The plow frame is supported on two wheels, one of which is a furrow wheel 8 located at the rear end of the frame and the other is a land wheel 9 located laterally from an intermediate portion of said frame.

In the embodiment of the invention shown in the drawings, two earth-working disks 10, 10, are shown, each provided with a suitable mounting indicated at 11. The mounting for the forward disk is carried by a laterally and rearwardly projecting arm or beam 12 secured to the forward diagonal member 2 of the main frame beam 1 and the mounting for the rear disk is secured to the rear diagonal member 3 of said main frame beam.

A bracket projects laterally from an intermediate portion of the main frame beam 1 and may comprise two members 14 and 15 secured respectively to the diagonal members 2 and 3 of said main frame beam as clearly shown in Figure 1. The bracket carries at its free end portion, a bearing 16 for an inclined land wheel axle 17, and the member 15 of said bracket supports another bearing 18 for said axle. The outer end of the land wheel axle 17 is bent as at 19 so that its spindle portion which enters the hub of the land wheel 9 will form a crank disposed horizontally, thus causing the land wheel to stand in a vertical position. It will be evident that if the inclined land-wheel axle be turned in its bearings, the land wheel will be angled (by reason of the horizontal spindle crank on said axle) from the position shown in Figure 1 and caused to assume a position at an angle to the longitudinal axis of the plow structure. The inclined axle is provided at its upper end with an up-turned crank 22.

The member 15 of the bracket is extended rearwardly and terminates in an arm 26 disposed parallel with the rear end portion of the main frame beam, a brace 27 being located between said arm and the rear diagonal member of said main frame beam.

A lever 28 having the shape of a bellcrank to provide two arms 29 and 29ª, is located at the rear end of the main frame beam and one arm (29) of this lever is made with a transverse tubular or sleeve portion 30 disposed between the arm 26 and the rear beam member 5 and pivotally connected with the same by means of a transverse bolt indicated at 31. That portion of the lever 28 which unites its two arms includes a vertical sleeve 32 which provides a bearing or mounting for the vertical portion of a swivel axle 33 for the rear furrow wheel 8, the spindle portion of said axle which enters the hub of said rear furrow wheel being inclined so that said furrow wheel will be disposed in an inclined position.

The rear end of a rod or pitman 34 is adjustably connected with the arm 29ª of the bell crank 28 and the forward end of this rod or pitman is connected with a hand lever 35 pivoted to the frame of a toothed segment 36 secured to the forward portion of the main frame beam, and said lever is provided with a detent to engage the segment 36.

It will be been that by operating the hand lever 35, motion will be transmited through the rod or pitman 34 to the bell crank 28, thus causing the latter to be turned on its pivotal connection with the rear end of the frame and power to be imparted to the rear furrow wheel and its axle to raise (or lower) the frame (with the land wheel serving as a fulcrum on the ground) to raise or lower the plow disks or adjust them for depth of plowing.

The swivel axle 33 is provided with a fixed arm 37 which projects from said axle adjacent to its spindle portion. A pitman 38 is pivotally connected at one end with the upper end of the rear axle arm 37, said rod or pitman being provided with a hook 39 which engages an eye 40 at the upper end of arm 37.

Passing to the details which are peculiar to this application, the tractor 7 has a draw head A provided with openings B adapted to receive a pin or the like C, holding a connection D which is united by securing elements E with the part 4 of the plow frame. The letter F marks a lateral bracket held by securing devices G on the draw head A, the securing devices preferably being mounted in certain of the openings B. A guide H is mounted on the bracket F and has a reduced stem I which is rotatable in the bracket, the stem of the guide being held in the bracket by any suitable means J.

The letter K marks a rigid connection or rod which may have a slight longitudinal sliding movement in the guide H. Abutments L, in the form of collars, are located on opposite sides of the guide H and are held on the connection of rod K by set screws M. Springs N surround the rod K, the inner ends of the springs abutting against the guide H, and the outer ends of the springs engaging the abutments L. On its rear end, the connecting rod K has a depending finger O which connects the pitman 38 of the furrow wheel 8, and the crank 22 of the axle of the land wheel 9.

It will be obvious that, when the tractor 7 changes its course, the lateral bracket F, cooperating with the connection rod K, will turn the wheels 8 and 9 laterally, to follow the course which the tractor 7 is taking.

The springs N serve to take up shocks when the soil engaging elements 10 strike a rock, stump or other obstruction. The wheels 9 and 8 are turned laterally by power derived from the tractor 7 and, in this respect, require neither attention nor expenditure of strength on the part of an operator.

What is claimed is:—

In a device of the class described, a tractor, a plow comprising a frame, a connecting device joining the plow to the tractor, a land wheel and a furrow wheel each mounted for rotation and for lateral swinging movement on the frame, mechanism for connecting the wheels for lateral swinging movement; and means for imparting lateral swinging movement to the wheels from the tractor, said means comprising a rigid connection pivoted to said mechanism, means for mounting the connection on the tractor at a point spaced laterally from the connecting device, for pivotal movement and for longitudinal movement, and yieldable means for resisting the longitudinal movement of the connection.

In testimony that I claim the foregoing as my own, I have hereto affixed my signature.

BENJAMIN P. COLLIER.